3,201,471
TETRALKYL DIMERIC FAT AMINES
Ralph Fisher, Walnut Creek, Calif., Leonard R. Vertnik, Minneapolis, Minn., Kirtland E. McCaleb, Oakland, Calif., and Ned M. Le Bard, Wayzata, Minn., assignors to General Mills, Inc., a corporation of Delaware
No Drawing. Filed Jan. 17, 1962, Ser. No. 166,946
4 Claims. (Cl. 260—583)

This is a continuation-in-part of application Serial No. 92,144, filed February 28, 1961.

This invention relates to new chemical compounds which have been found to have various industrial uses, in the fabrication of plastic articles, and elsewhere. More specifically, this invention relates to novel and useful high molecular weight tertiary amines: tetralkyl dimeric fat amines.

The problem of static charge build-up on articles manufactured of plastic materials is well known. This charge build-up offers difficulty in fabrication, handling, and storage. In certain plastics, this problem is extremely difficult to combat. Linear polyethylene is a plastic for which few, if any, suitable anti-static additives are available.

The compounds of the present invention have been shown to be effective in markedly reducing static charge build-up in plastic articles, particularly linear polyethylene. Previously available compounds, although sufficiently polar to dissipate static charges, have not exhibited the unique degree of solubility and/or compatibility required. Effective compounds cannot be too compatible with or soluble in the synthetic resin. That is, to be effective on an economical basis, a fair degree of orientation at the surface is required. Conversely, a compound too insoluble in the resin will exude therefrom causing loss of effectiveness and difficulties from "greasy feel" or from lack of printability. The compounds of the present invention exhibit the range of solubility and compatibility, and the charge dissipation necessary to exhibit excellent anti-static properties when incorporated as a small percentage additive in synthetic resin systems.

In addition to requiring anti-static additives, many plastic articles may also require an anti-oxidant to prevent discoloration and/or embrittlement. The physical requirements for an effective anti-oxidant are essentially those for an anti-static agent—that is, borderline compatibility so as to promote migration to the surface. The compounds of the present invention combine the required solubility and compatibility with an effective anti-oxidant function when incorporated as a small percentage additive in synthetic resin systems.

The high temperature stability of these high molecular weight ditertiary amines renders them suitable for use in molding systems where high forming temperatures are necessary. The products of our invention will not degrade at temperatures as high as 250° C. and thus will not lose their protective functionality at these temperatures.

An object, therefore, of the present invention is to provide a novel and useful family of chemical compounds.

A further object is to provide a family of unique high molecular weight tetralkyl diamines useful as anti-static additives in various synthetic resin systems.

A still further object is to provide a family of unique high molecular weight tetralkyl diamines useful as anti-oxidants in various synthetic resin systems.

Chemically the compounds of the present invention are defined as:

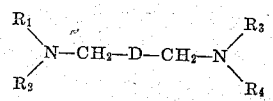

where $R_1$, $R_2$, $R_3$, and $R_4$ are substituted or unsubstituted aliphatic radicals, and D is the polymeric fat acid radical as defined infra.

The term polymeric fat acid can be defined as follows: the term "fat acids" is intended to include saturated, ethylenically unsaturated and acetylenically unsaturated naturally occurring and synthetic monobasic aliphatic acids containing from 8–24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical" respectively.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, elostearic acid, hyragonic acid, morotic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10 undecynoic acid, tariric acid, stearolic acid, behenolic acid, and isamic acid.

Because of their ready availability and relative ease of polymerization, oleic and linoleic acid are the preferred starting materials for the preparation of the polymeric fat acids.

The compounds of the present invention are readily prepared by the method of our co-pending application U.S. Ser. No. 92,144, filed February 28, 1961, of which the present application is a continuation-in-part. The carboxyl groups of polymeric fat acids are converted to their disubstituted amides, preferably in the presence of an excess of secondary amine, and then converted to the teritary amine by hydrogenation in the presence of a suitable catalyst. This reaction may be diagrammed as follows:

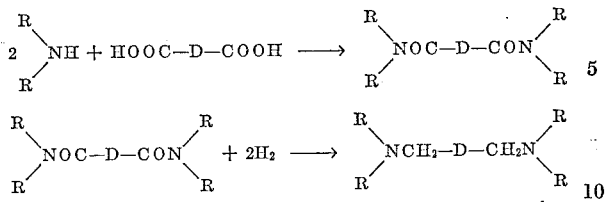

where D is as described above and R has the meaning ascribed to $R_1$, $R_2$, $R_3$, and $R_4$ above.

Suitable secondary amines for use in the conversion to the disubstituted amide groups of the above starting materials for the preparation of the tetralkyl dimeric fat amines are

where $R_1$ and $R_2$ can be saturated or unsaturated aliphatic hydrocarbon radicals of from 1 to 18 carbon atoms, or substituted aliphatic radicals, e.g., dimethyl amine, diethyl amine, di-(2-ethylhexyl) amine, dilauryl amine, distearyl amine, dioleyl amine, dilinoleyl amine, secondary fatty amines derived from natural fats and oils such as tallow, coco, soy, cottonseed, etc., and the like; or hydroxy-substituted amines such as diethanol amine, di-(hydroxystearyl) amine and the like.

The compounds of the present invention as a family are applicable to a variety of synthetic resin systems: polyethylene, both high density and conventional, polypropylene, polyvinyl chloride and its copolymers, polystyrene, polyesters, and nylon molding resins. The selection of a specific tetralkyl dimeric fat amine for a specific synthetic resin system is best done by simple experimentation. For example, the N,N,N',N'-tetramethyl dimeric fat diamine has been found to be the preferred anti-static and anti-oxidant additive in high density polyethylene.

The compounds of the present invention can be incorporated into the synthetic resin systems in any of a number of ways—conventionally, by addition to the molding polymer before extrusion, or by milling into the extruded resin, or by direct application to or incorporation in the resin just prior to or during the molding operation. The preferred method is the incorporation of the additive into the polymer before extrusion into the form most suitable for subsequent molding operations.

The amount of additive required depends on a number of conditions: the particular tetralkyl compound selected, the specific resin system, conditions of molding, and the end use to which the molded article is to be put. Polarity per unit weight is a function of molecular weight in the compounds of this invention, hence effectiveness per unit weight is a function of the alkyl groups appended to the two nitrogen atoms. Certain resin systems are much more susceptible to oxidation and present a greater or lesser static charge pickup problem. Specific fabricated articles have need for greater or lesser protection against oxidation or against static build-up, phonograph records being a typical example of the latter. Generally speaking, however, the compounds of the present invention would be effective over a range of about 0.1 to 3.0% by weight of the synthetic resin.

The invention will be further illustrated in conjunction with the following examples, which are intended as illustrative only and not by way of limitation.

*Example I*

Into a 1000 ml. reactor were charged 600 grams of N,N,N',N'-tetra-(2-ethylhexyl) diamide prepared from dimerized linoleic acid and di-(2-ethylhexyl) amine. The acid value of the diamide was 8.8. Thirty grams of copper-chromium oxide catalyst was added and the reaction was pressurized with hydrogen to 400 p.s.i.g. and heated to 260° C. and maintained at this temperature while gases consisting mostly of hydrogen and by-product water were continually vented from the system, the pressure being maintained at 400 p.s.i.g. over a period of 54 hours at which point the reaction was cooled to 100° C., the hydrogen vented and the product filtered. Analysis of the clear light-colored product indicated that it was 93.0% of N,N,N',N'-tetra-(2-ethylhexyl) dimeric fat amine.

*Example II*

Into a 1000 ml. reactor were charged 600 grams of N,N,N',N'-tetramethyl diamide (acid number=2.4) of distilled dimeric linoleic acid and 60 grams of copper-chromium oxide catalyst (Girdler's G-13). The reactor was pressurized with hydrogen to 400 p.s.i.g. The reactor was heated to 260° C. and maintained at this temperature while gases were continuously vented from the system. The pressure was maintained with hydrogen at 400 p.s.i.g. After 35.5 hours the reactor was cooled to 100° C., the hydrogen vented and the product filtered. Analysis of the clear light-colored product indicated that it was essentially all N,N,N',N'-tetramethyl dimeric fat amine with only 1.1% of non-amine present. The total amine number was 149 and the tertiary amine number was 149.

When this N,N,N'-N'-tetramethyl dimeric fat amine was milled into high density polyethylene at a level of from 0.5 to 1.0% by weight, a significant reduction in static charge and dirt pickup as well as an anti-oxidant effect was obtained.

*Example III*

Into a pressure reactor were charged 295 pounds of tetramethyl dimer diamide and 14.7 pounds of Girdler's G-13 catalyst. The reaction was pressurized to 650 p.s.i.g. with hydrogen and heated to 250° C. At this time the hydrogen circulation pump was started and also the dimethyl amine feed pump. The water formed by the hydrogenation was removed from the circulating hydrogen by means of scrubber which condensed water vapor and absorbed dimethyl amine. After about 10 hours of hydrogenation, during which time dimethyl amine was added continuously, the product was filtered and analyzed.

Total amine number _____ 174
Tertiary amine number _____ 171
Gardner color _____ 1

The product was virtually all N,N,N',N'-tetramethyl dimeric fat amine.

Other tetrasubstituted diamines can be prepared as described in these examples by substituting for the simple aliphatic secondary amines those unsubstituted and substituted secondary amines contemplated above.

The embodiments of the present invention in which an exclusive property or privilege is claimed are defined as follows:

1. As a composition of matter a compound having the structure

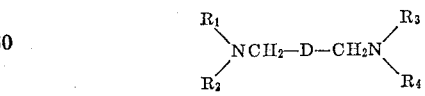

where $R_1$, $R_2$, $R_3$, and $R_4$ are selected from the group consisting of aliphatic hydrocarbon radicals of from 1 to 18 carbon atoms and hydroxy substituted aliphatic hydrocarbon radicals of from 1 to 18 carbon atoms, and D is a dimeric fat radical.

2. A composition of claim 1 where $R_1$, $R_2$, $R_3$, and $R_4$ are selected from the group consisting of saturated and unsaturated monovalent alkyl radicals of from 1 to 18 carbon atoms.

3. N,N,N',N'-tetramethyl dimeric fat amine.

4. N,N,N',N'-tetra-(2-ethylhexyl) dimeric fat amine.

(References on following page)

References Cited by the Examiner

UNITED STATES PATENTS

| | | | |
|---|---|---|---|
| 2,416,738 | 3/47 | Cashion | 260—583 X |
| 2,460,733 | 2/49 | Bruson et al. | 260—583 |
| 2,652,430 | 9/53 | De V. Finch et al. | 264—583 |
| 2,739,986 | 3/56 | Scudi et al. | 264—583 |
| 2,809,955 | 10/57 | Matheson et al. | 260—45.9 |
| 2,830,033 | 4/58 | Beaver | 260—45.9 |

CHARLES B. PARKER, *Primary Examiner.*